United States Patent
Iwasaki

(10) Patent No.: US 9,569,147 B2
(45) Date of Patent: Feb. 14, 2017

(54) IMAGE FORMING APPARATUS, IMAGE PROCESSING SYSTEM, AND METHOD

(71) Applicant: FUJI XEROX CO., LTD., Tokyo (JP)

(72) Inventor: Manabu Iwasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/841,830

(22) Filed: Sep. 1, 2015

(65) Prior Publication Data

US 2016/0274822 A1    Sep. 22, 2016

(30) Foreign Application Priority Data

Mar. 20, 2015  (JP) ................. 2015-058376

(51) Int. Cl.
*G06F 15/00* (2006.01)
*G06F 3/12* (2006.01)

(52) U.S. Cl.
CPC ........... *G06F 3/121* (2013.01); *G06F 3/1234* (2013.01); *G06F 3/1287* (2013.01); *G06F 3/1288* (2013.01)

(58) Field of Classification Search
USPC ..................................... 358/1.14
See application file for complete search history.

(56) References Cited

U.S. PATENT DOCUMENTS

2010/0195136 A1*  8/2010  Shudo ............. G06F 21/608
                                                   358/1.14
2013/0077128 A1*  3/2013  Ichida ............ G06F 3/1204
                                                   358/1.15

FOREIGN PATENT DOCUMENTS

JP   2007-94721 A    4/2007
JP   2009-151470 A   7/2009

* cited by examiner

*Primary Examiner* — Saeid Ebrahimi Dehkord
(74) *Attorney, Agent, or Firm* — Sughrue Mion, PLLC

(57) ABSTRACT

An image forming apparatus includes an acquiring unit, a determining unit, and a notifying unit. The acquiring unit acquires print data from an external apparatus via a network. The print data is generated by the external apparatus from document data received from a client apparatus. The determining unit determines whether or not the acquired print data is a dummy job or an actual job. The notifying unit notifies failure information when print data of the actual job is not acquired within a period after print data which is determined to be the dummy job is acquired. The failure information indicates a failure occurring in the process in which the external apparatus receives the document data from the client apparatus, or in the process in which the print data is generated from the document data in the external apparatus. The period satisfies a predetermined condition.

17 Claims, 11 Drawing Sheets

IMAGE FORMING APPARATUS, IMAGE PROCESSING SYSTEM, AND METHOD

CROSS-REFERENCE TO RELATED APPLICATIONS

This application is based on and claims priority under 35 USC 119 from Japanese Patent Application No. 2015-058376 filed Mar. 20, 2015.

BACKGROUND (i) Technical Field

The present invention relates to an image forming apparatus, an image processing system, and a method.

(ii) Related Art

A system, such as Google Cloud Print™, in which a print server function is provided from a server (which may be a cloud computing system) on a network such as the Internet has become widespread. An exemplary known system of this type is a system in which, when a user uploads document data to a server on a network, the server converts the document data into a print data format and provides the print data for a printer which is specified as an output destination and on which the print data is printed. In the case where the printer which is an output destination is located far from a client apparatus used by the user when the user gives a print instruction to the server, the user gives a print instruction, then goes to the printer specified as an output destination, and obtains printed material which is output by the printer.

SUMMARY

According to an aspect of the invention, there is provided an image forming apparatus including an acquiring unit, a determining unit, and a notifying unit. The acquiring unit acquires print data from an external apparatus via a network. The print data is generated by the external apparatus from document data received from a client apparatus. The determining unit determines whether or not the acquired print data is a dummy job or an actual job. The notifying unit notifies failure information when print data of the actual job is not acquired within a period after print data which is determined to be the dummy job is acquired. The failure information indicates a failure occurring in the process in which the external apparatus receives the document data from the client apparatus, or in the process in which the print data is generated from the document data in the external apparatus. The period satisfies a predetermined condition.

BRIEF DESCRIPTION OF THE DRAWINGS

Exemplary embodiments of the present invention will be described in detail based on the following figures, wherein.

DETAILED DESCRIPTION

Figure 1:
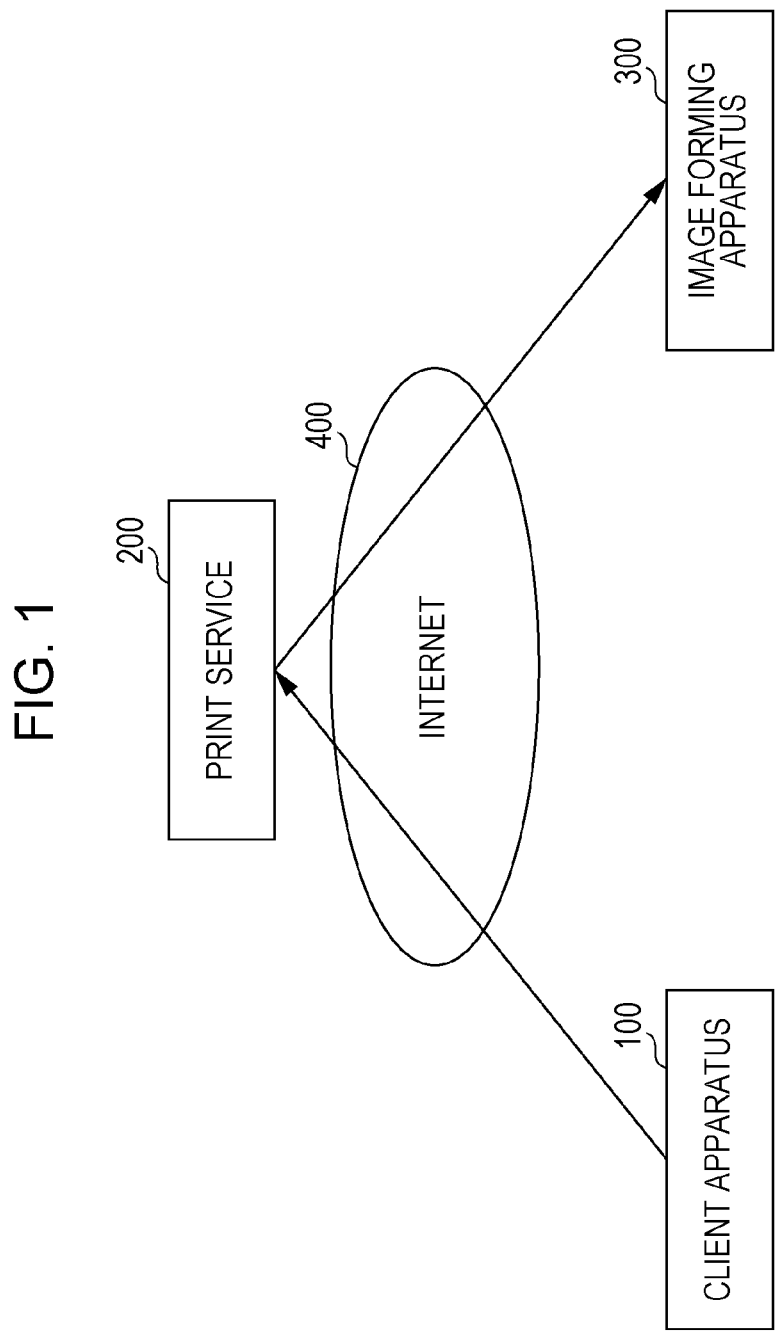
FIG. 1 is a diagram illustrating an exemplary system to which control according to an exemplary embodiment is applied.

Referring to FIG. 1, an exemplary system to which control according to an exemplary embodiment is applied will be described. The system includes a client apparatus 100, a print service 200, and an image forming apparatus 300 which are connected to the Internet 400. The client apparatus 100 and the image forming apparatus 300 are capable of communicating with the print service 200 via the Internet 400.

The client apparatus 100 is a computer such as a personal computer (PC) operated by a user, and is a client apparatus receiving a service from the print service 200.

The print service 200 is a server providing a data processing service for printing, for the client apparatus 100. The print service 200 has a function of, upon reception of a print instruction from the client apparatus 100, obtaining document data (for example, document data generated by using a word processor application) to be printed, converting the document data into print data in a predetermined data format (for example, Portable Document Format (PDF)™), and supplying the resulting print data to the image forming apparatus 300 which is specified as an output destination. In addition, the print service 200 has a function of managing a print job (hereinafter simply referred to as a "job") corresponding to a print instruction received from a user via the client apparatus 100. When the print service 200 is Google Cloud Print™ (hereinafter referred to as "GCP"), the print service 200 has a function of obtaining information about the status of a job which is input by a user, from the image forming apparatus 300 which is an output destination, and supplying a web page in which the job status is described, on a web browser (for example, a web browser on the client apparatus 100) operated by the user. The print service 200 may be a single server, or may be configured as a cloud computing system (for example, GCP).

The image forming apparatus 300 is an apparatus for printing received print data on a sheet of paper. The image forming apparatus 300 may be provided with functions other than a print function. For example, the image forming apparatus 300 may be a so-called digital multi-function device which is provided with a scan function, a copy function, a fax transmission function, and an email transmission function, in addition to a print function. The image forming apparatus 300 has a function of performing copying, scanning, printing, and the like in accordance with an instruction which is input by a user and which is received through a user interface (UI) of the image forming apparatus 300, and also has a function of obtaining print data from the print service 200 on the Internet 400 and printing the print data. The image forming apparatus 300 may be connected to a network in an organization of a company or the like. In this case, the image forming apparatus 300 has a function of performing a process such as printing in accordance with an instruction transmitted from a computer connected to a network in the organization.

The image forming apparatus 300 is registered in advance in the print service 200. The print service 200 uses information (for example, an address for communication) about the registered image forming apparatus 300 to supply information necessary for printing, to the image forming apparatus 300. The image forming apparatus 300 also has information about the address or the like of the print service 200, and communicates with the print service 200 by using the information.

For example, when the print service 200 is GCP, the image forming apparatus 300 is registered in association with one administrator in the print service 200. The administrator may register sharers sharing the corresponding image forming apparatus 300 in the print service 200. The print service 200 presents, to a user (client apparatus 100), one or more image forming apparatuses 300 in which the user is registered as an administrator or a sharer, as output destination candidates, and makes the user select an output destination from the candidates.

The above-described functions of the components of the system illustrated in FIG. 1 are those in the related art. The flow of a print process in the system in FIG. 1 will be described with reference to FIG. 2.

First, a user uses a web browser on the client apparatus 100 to access the print service 200 (for example, GCP) and give a print instruction. At that time, the user specifies document data to be printed, print parameters, such as the number of copies and single-sided/double-sided printing, an image forming apparatus 300 which is an output destination, and the like. After completion of the specifying of necessary information, when the user gives a print instruction, the client apparatus 100 transmits the specified document data to the print service 200 (in step S10). If the transmission of the document data fails due to some cause such as communication failure, the client apparatus 100 which is capable of detecting the failure displays a screen describing a message about the failure, and ends the print process (in step S11). If the transmission of the document data is successfully completed, the print service 200 performs a process for preparing printing of the document data, for example, a process of converting the document data into print data of data format supported by the image forming apparatus 300 which is an output destination (in step S12). If the conversion fails, the print service 200 transmits information about the failure to the client apparatus 100, and the client apparatus 100 displays the failure information on a screen and ends the print process (in step S13).

If the process in step S12 (print preparation) is successfully performed, the print service 200 notifies completion of print preparation for the document data, to the image forming apparatus 300 which is the specified output destination (in step S14). In the case of GCP, an instant messaging protocol which is called Extensible Messaging and Presence Protocol (XMPP) via the Google Talk service is used to transmit the notification.

The image forming apparatus 300 which has received the notification accesses the print service 200 to obtain management information of the document (print data) whose output destination is the image forming apparatus 300 (in step S16). The obtained management information includes identification information (job ID) of the print data and a uniform resource locator (URL) of the print data.

The image forming apparatus 300 which has obtained the management information of the document uses the management information to request the document (print data) from the print service 200 (in step S18). For example, the request is issued as a GET request of Hypertext Transfer Protocol (HTTP) by using the URL included in the management information. After that, while receiving print data transmitted in response to the request, the image forming apparatus 300 prints the print data on a sheet of paper (in step S20). When reception and printing of all of the print data are completed, the print job is ended.

In this process, in the case where the print service 200 is, for example, GCP, when either of the stage of transmission of document data from the client apparatus 100 to the print service 200 (step S10) and the stage of conversion of the document data in the print service 200 (S12) fails, the failure is notified to the client apparatus 100 and a message about the failure is displayed. In contrast, the failure is not notified to the image forming apparatus 300 which is an output destination. Therefore, in the case where a user leaves the client apparatus 100 and goes to the image forming apparatus 300 to get the print result just after the user gives a print instruction by using the client apparatus 100, when a failure occurs in step S10 or S12, the user is not informed of the failure from the UI of the image forming apparatus 300.

Figure 2:
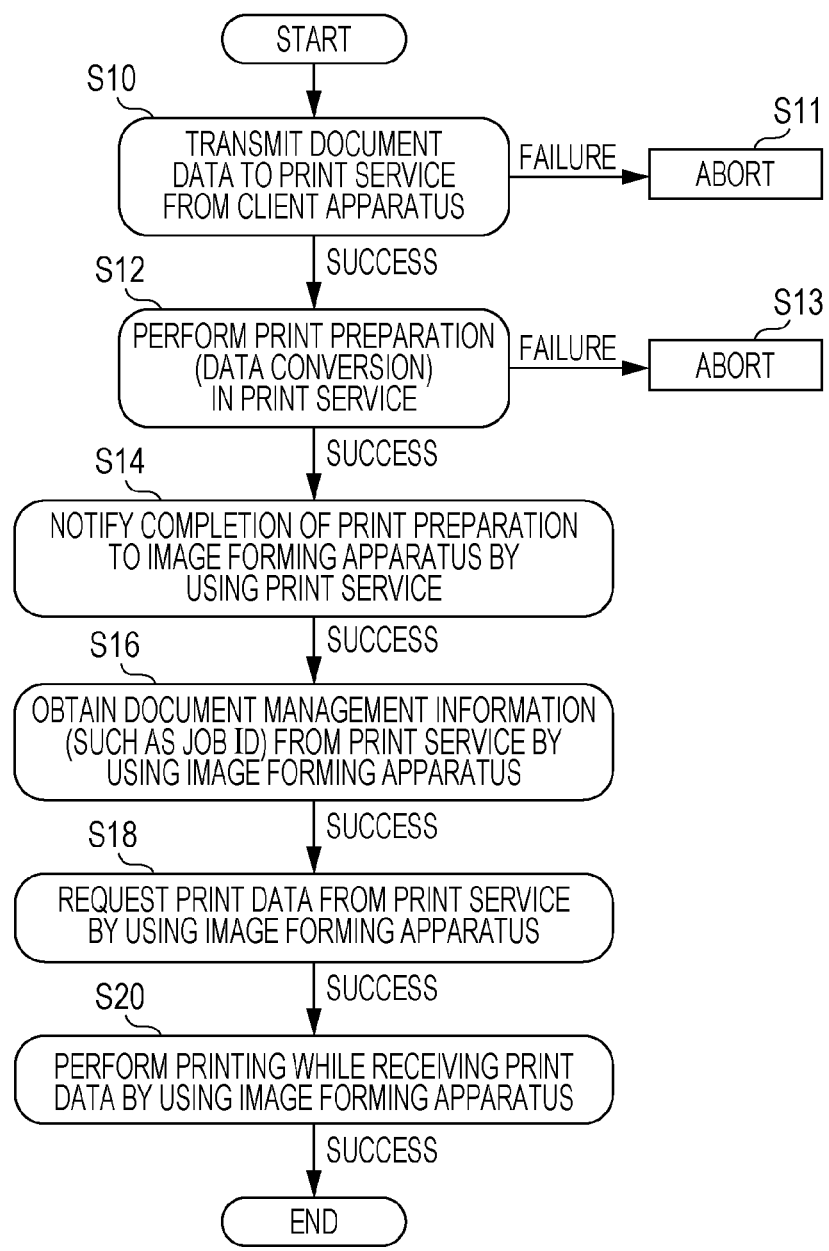
FIG. 2 is a diagram illustrating a print process of the related art in the system in FIG. 1.
Figure 3:
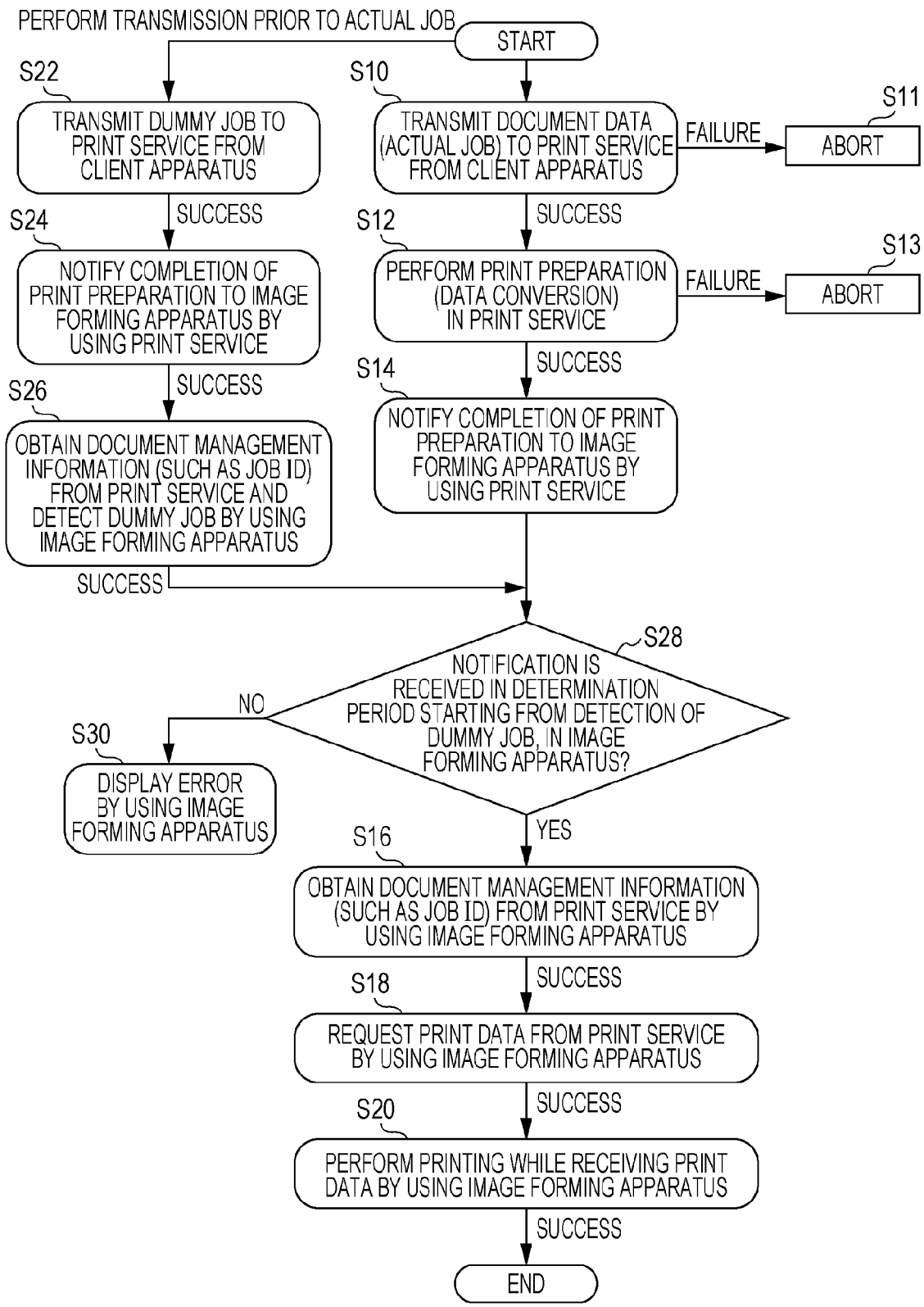
FIG. 3 is a diagram illustrating an exemplary procedure according to the exemplary embodiment.

FIG. 3 illustrates an exemplary procedure for addressing this situation, according to the exemplary embodiment. In FIG. 3, steps similar to those in FIG. 2 are designated with identical reference characters.

In the example in FIG. 3, the client apparatus 100 which has received an instruction to print document data from a user first transmits a print instruction for a dummy job, to the print service 200 (in step S22), and subsequently transmits an instruction to print the document data, to the print service 200 (in step S10).

The dummy job is a print instruction which does not include document data to be printed (or, which includes document data whose data amount of an actual document is equal to zero) or which includes a very small amount of document data having a fixed form. In addition, the dummy job includes predetermined data indicating that the job is a dummy job. The data indicating that the job is a dummy job is incorporated in document data or in attached information such as header information which is transmitted to the print service 200 and which is accompanied with the document data, in such a predetermined manner as to be recognized by the image forming apparatus 300. As the document data of a dummy job, for example, a test page provided by the print service 200 or the vendor of the image forming apparatus 300 may be used. In contrast to a dummy job, the document data which is to be printed and which is transmitted in step S10 is called an "actual job" (or a process for printing the document data is called an "actual job").

The dummy job is transmitted to the print service 200 before the actual job, and is data much smaller than the actual job. Therefore, the time required for conversion in the print service 200 is short. Accordingly, print preparation for the dummy job in the print service 200 is completed much earlier than completion of print preparation for the actual job. As soon as the preparation is completed, the print service 200 notifies the image forming apparatus 300 of completion of the print preparation (in step S24), and the image forming apparatus 300 obtains document management information for the dummy job from the print service 200 in response to the notification (in step S26). If the document management information includes data indicating that the job is a dummy job, the image forming apparatus 300 recognizes that the notified job is a dummy job and that the actual job corresponding to the dummy job is coming (this is the case in which the attached information includes data indicating that the job is a dummy job). In the case where the data indicating that the job is a dummy job is included in the document data, the image forming apparatus 300 uses the obtained document management information to obtain print data corresponding to the document data from the print service 200, and determines whether or not information in the print data indicates that the job is a dummy job.

Thus, the process of notifying completion of print preparation to the image forming apparatus 300 (S24) (and a subsequent process of transmitting document management information or print data (S26)) which is performed for the dummy job is performed earlier than that performed for the actual job. Therefore, the dummy job acts as an advance notice that an actual job is coming, for the image forming apparatus 300.

The image forming apparatus 300 which has detected a dummy job which has been received (in step S26) waits for a notification that print preparation for the actual job is completed, for a predetermined determination period starting from the time point of the detection (in step S28).

The determination period used in this step is a period having a length according to a time required to upload the document data of the actual job from the client apparatus 100 to the print service 200 and to convert the document data into print data in the print service 200. The length of the determination period may be a typical fixed value determined, for example, by using past experiences, or may be a variable value determined in accordance with the data size of the document data of the actual job (the time required for the uploading and the conversion is substantially proportional to the size of the document data). One way of using a variable value according to the size of the document data, as the determination period is that, for example, the client apparatus 100 describes information about the size of the document data of the actual job, in attached information such as the header of a print instruction for the dummy job which is transmitted to the print service 200. Thus, the size information of the document data is embedded in the document management information for the dummy job, and is transmitted from the print service 200 to the image forming apparatus 300 in step S26.

If the image forming apparatus 300 receives a notification of completion of print preparation for the actual job, within the determination period starting from the time point of detection of the dummy job (if the determination result is YES in step S28), the image forming apparatus 300 performs printing for the actual job by performing the processes in steps S16 and S18.

At a time point at which the determination time has elapsed from the time point of detection of the dummy job, if a notification of completion of print preparation for the actual job has not been received (if the determination result is NO in step S28), this state indicates that the notification has not been received although the time when print preparation for the actual job should be completed has come. In this case, any failure may occur in the stage of the uploading of the document data from the client apparatus 100 to the print service 200 or in the stage of the print preparation (such as conversion of the document data) in the print service 200.

Figure 4:
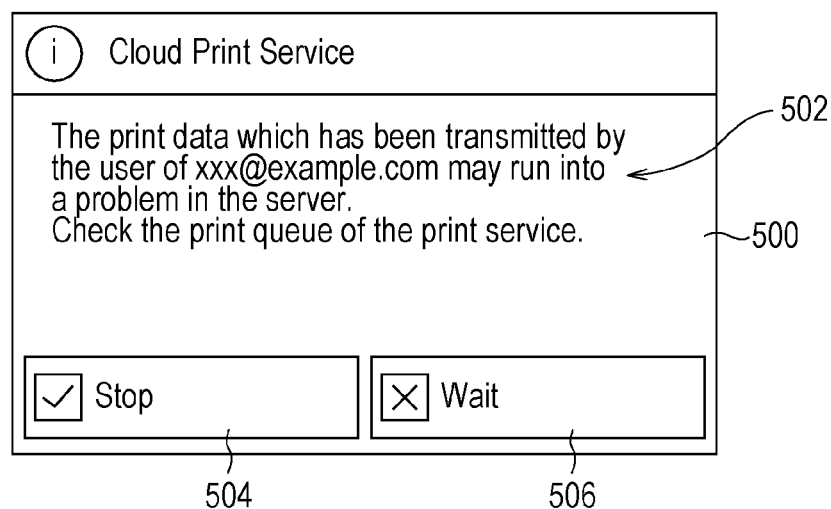
FIG. 4 is a diagram illustrating an exemplary error screen.

If a failure occurs in either of the stages, the print service 200 does not notify the image forming apparatus 300 of the failure (especially when the print service 200 is GCP). Therefore, the image forming apparatus 300 does not know that a failure actually has occurred in either of the stages. However, the image forming apparatus 300 may determine that a failure "possibly" occurs, because a notification for the actual job has not come after a notification of the dummy job. Thus, if the determination result in step S28 is determined to be NO, the image forming apparatus 300 displays an error screen on an attached display apparatus (such as a touch panel display) (in step S30). FIG. 4 illustrates an exemplary display of the error screen. In an error screen 500 in FIG. 4, a message 502 describing that some problem regarding the print instruction transmitted by the user may be happening in the print service 200 is displayed. In the error screen 500, buttons 504 and 506 which are used to address the problem and which are used by the user to give an instruction to stop the printing or to wait for completion of the printing without stopping the printing are also displayed.

Thus, in the exemplary embodiment, by submitting a dummy job before an actual job, the image forming apparatus 300 may be informed of the actual job which is coming. In the case where the image forming apparatus 300 has waited for a period which is probably required to perform a process for the actual job in the print service 200 from the notification time point, and where a notification for the actual job (S14) has not come, the image forming apparatus 300 may determine that some problem regarding the actual job possibly arises in a stage before the actual job reaches the print service 200 or in a stage before print preparation for the actual job in the print service 200. Then, the image forming apparatus 300 may notify the user, for example, by displaying a message about the failure on an attached screen. The user receives the notification and addresses the problem. For example, as a possible coping method performed by the user, the user may return back to the client apparatus 100 to access the print service 200, and may check the status of the transmitted job. When the check result is that the job has failed in the transmission stage or the print preparation stage in the print service 200, the user may cancel the job, and may give another print instruction for the same document data. In the case of the related art without using a dummy job, even if a failure occurs in the transmission stage or in the print preparation stage, the image forming apparatus 300 never recognizes that the failure has actually occurred or the failure has possibly occurred. Therefore, the image forming apparatus 300 fails to transmit a notification (such as the error screen in FIG. 4) indicating that such a failure possibly occurs. Therefore, in the related art, the user who has moved to the image forming apparatus 300 has a difficulty in determination (has no information used to make determination) as to whether the user is to continue to wait or is to access the print service 200 to check the condition, when the print output for the document data which has been input does not come out for a long time.

Figure 5:
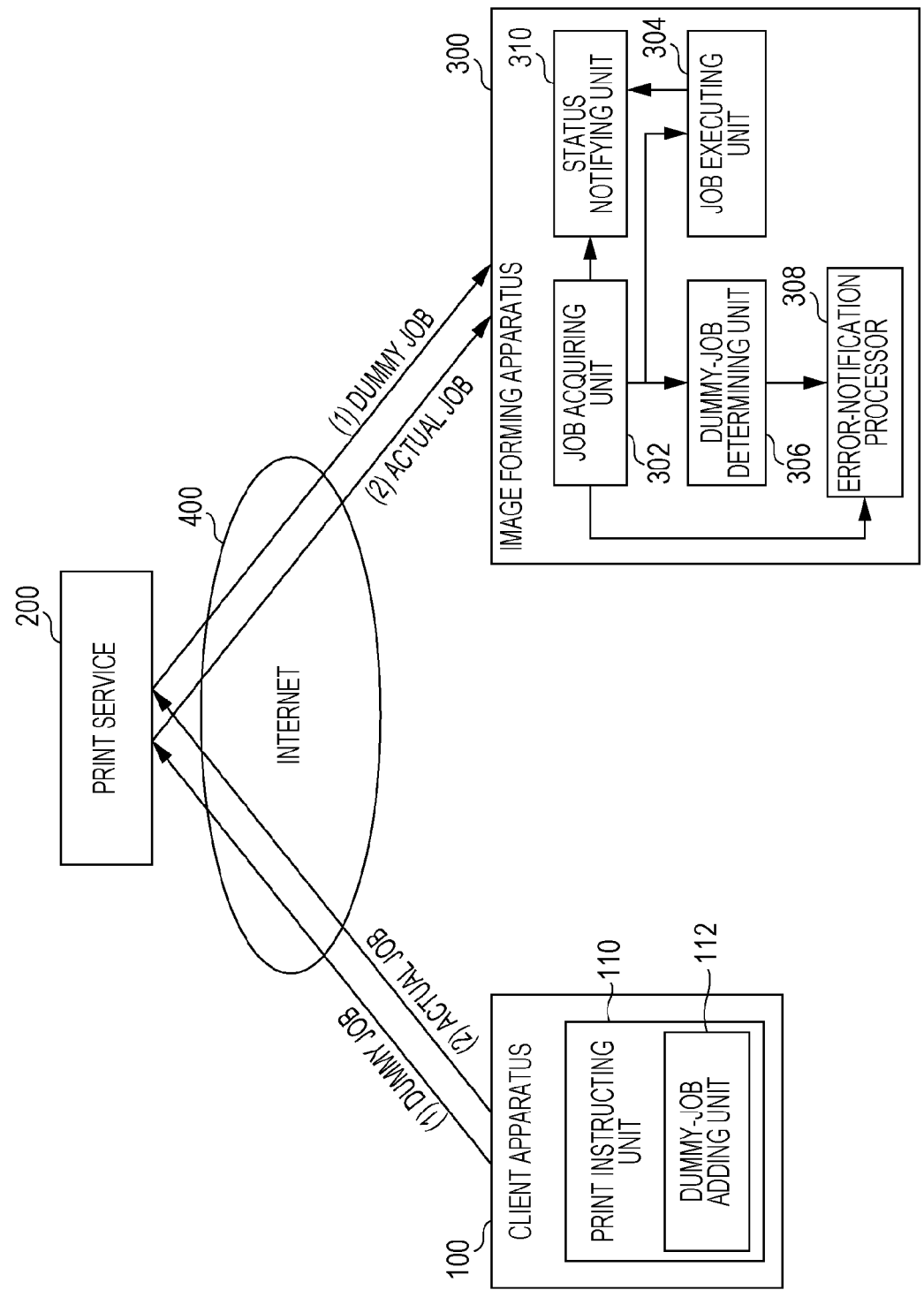
FIG. 5 is a diagram illustrating an exemplary functional configuration of a client apparatus and an image forming apparatus in a system according to the exemplary embodiment.

Referring to FIG. 5, an exemplary functional configuration of the client apparatus 100 and the image forming apparatus 300 in the system according to the exemplary embodiment will be described.

The client apparatus 100 includes a print instructing unit 110 which performs a process for giving a print instruction to the print service 200. The print instructing unit 110 is installed in the client apparatus 100, for example, as utility software. The print instructing unit 110 logs in to a user account in the print service 200. The print instructing unit 110 receives specification of document data to be printed and print parameters, and also receives an instruction to start printing. At that time, the print instructing unit 110 may receive a web page on which various specifications are input, from the print service 200, and may transmit information which is input by a user on the web page, to the print service 200. The document data to be printed is not limited to one stored in the client apparatus 100. For example, a document for which access permission is owned by the user and which is stored in a document management system that is present on a network and that may be accessed from the client apparatus 100 may be specified as a print target. In this case, the client apparatus 100 may download the specified document from the document management system and transfer the document to the print service 200. Alternatively, the client apparatus 100 may transmit the URL of the document as information about the document to be printed, to the print service 200, and the print service 200 may use the URL to download the document data from a document management system.

The print instructing unit 110 according to the exemplary embodiment includes a dummy-job adding unit 112. When a user instructs the print instructing unit 110 to start printing, the dummy-job adding unit 112 transmits a print instruction for a dummy job to the print service 200 before transmitting a print instruction for document data specified as a print target, to the print service 200. Therefore, (1) a print instruction for a dummy job is first transmitted from the client apparatus 100 to the print service 200, and (2) a print instruction for the document data to be printed (actual job) is then transmitted.

In the exemplary embodiment, the print service 200 does not need to perform a special process for a dummy job, and may perform the process in a way similar to that for a normal job. As described above, since the dummy job comes first and the time required for print preparation is short, (1) a notification of completion of print preparation for the dummy job is transmitted from the print service 200 to the image forming apparatus 300, and, after that, (2) a notification of completion of print preparation for the actual job is transmitted.

The image forming apparatus 300 includes a job acquiring unit 302, a job executing unit 304, a dummy-job determining unit 306, and an error-notification processor 308.

The job acquiring unit 302 performs a process for obtaining job information from the print service 200. When the job acquiring unit 302 receives notifications of completion of print preparation for jobs (a dummy job and an actual job) from the print service 200 (in steps S14 and S24), the job acquiring unit 302 obtains document management information for these jobs from the print service 200 (in steps S16 and S26). When it is possible to receive a next job, for example, because the process for a job in the queue is completed, the job acquiring unit 302 obtains print data of the job from the print service 200 (in steps S18 and S20). The job executing unit 304 controls the print engine in accordance with the print data acquired by the job acquiring unit 302 so that an image indicated by the print data is printed on a sheet of paper.

The dummy-job determining unit 306 analyzes the document management information or the print data acquired by the job acquiring unit 302, and determines whether the job indicated by the information is a dummy job or an actual job. For example, if the document management information or the print data contains information indicating that the job is a dummy job, the dummy-job determining unit 306 determines that the job is a dummy job. Otherwise, the dummy-job determining unit 306 determines that the job is an actual job. When the dummy-job determining unit 306 determines that the obtained job is a dummy job, the dummy-job determining unit 306 transmits a message that a dummy job has been received, to the error-notification processor 308.

Upon reception of a notification that a dummy job has been received, from the dummy-job determining unit 306, the error-notification processor 308 starts a timer which is set to the length of the determination period with which an error is determined. When the document management information for the dummy job which is acquired by the job acquiring unit 302 contains information about the data size of the document of the actual job, the error-notification processor 308 may determine the length of the determination period in accordance with the data size. When a notification of completion of print preparation for the actual job has not been received at the time point at which the timer shows that the determination period has elapsed, the error-notification processor 308 displays an error screen indicating that some problem (error) possibly arises in the print service 200, on the display apparatus.

A status notifying unit 310 is a functional module for notifying the print service 200 of a transition in the job status in the image forming apparatus 300. The print service 200 provides information about the job status notified from the status notifying unit 310, for example, for a user by displaying the information on a web page.

Figure 6:
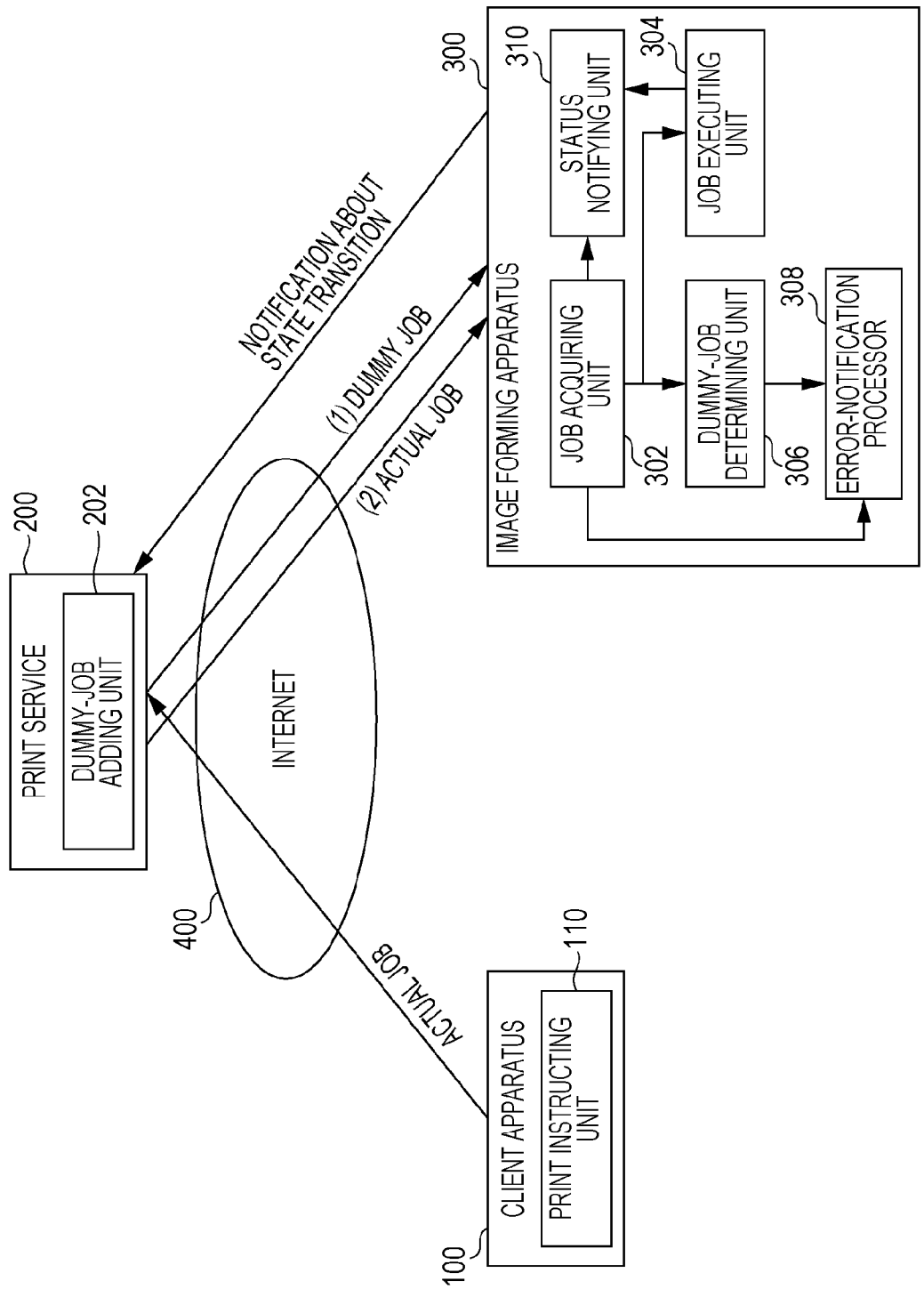
FIG. 6 is a diagram illustrating another exemplary system configuration according to the exemplary embodiment.

Referring to FIG. 6, another exemplary system configuration according to the exemplary embodiment will be described. Among the components illustrated in FIG. 6, components similar to those in FIG. 5 are designated with the same reference numerals as those in FIG. 5.

In the system in FIG. 5, the print instructing unit 110 in the client apparatus 100 adds a dummy job. In contrast, in the system in FIG. 6, a dummy-job adding unit 202 in the print service 200 adds a dummy job.

In the system, the print instructing unit 110 of the client apparatus 100 does not need to add a dummy job, and simply has a function of giving a normal print instruction (that is, only an actual job) to the print service 200.

When the dummy-job adding unit 202 of the print service 200 receives a print instruction from the client apparatus 100, the dummy-job adding unit 202 generates (a notification of completion of print preparation and the like for) a dummy job, and transmits it to the image forming apparatus 300. After that, when the process of generating print data of the document for which the print instruction has been given is completed, the dummy-job adding unit 202 transmits a notification of completion of print preparation for the actual job to the image forming apparatus 300. The other functions of the print service 200 and the image forming apparatus 300 may be the same as those in the example in FIG. 5.

First Modified Exemplary Embodiment

In the exemplary embodiment, it is assumed that the job which is subsequently received by the image forming apparatus 300 after the image forming apparatus 300 receives (a notification of completion of print preparation for) a dummy job is (a notification of completion of the print preparation for) the actual job corresponding to the dummy job. Thus, the dummy job and the actual job are not explicitly associated with each other.

In contrast, in a first modified exemplary embodiment, the dummy job and the actual job are explicitly associated with each other. The association may be made, for example, by embedding identification information (for example, a document file name) of the corresponding actual job in the document data of the dummy job or in attached information such as the header of the dummy job. For example, the document file name of the dummy job is generated by using a rule that a specific string indicating that the job is a dummy job is added to the document file name of the corresponding actual job. In contrast to the above-described method, the association between the dummy job and the actual job may be made by embedding identification information of the corresponding dummy job in the document data of the actual job or in attached information such as the header of the actual job.

The association between the dummy job and the actual job may be made by the dummy-job adding unit 112 (in FIG. 5) or the dummy-job adding unit 202 (in FIG. 6).

In the first modified exemplary embodiment, when the image forming apparatus 300 detects a dummy job (in step S26 in FIG. 3), the image forming apparatus 300 activates a timer corresponding to the dummy job. That is, for each dummy job, the image forming apparatus 300 determines whether or not a notification of the actual job corresponding to the dummy job has been received, until the determination time has elapsed from the time point of the detection of the dummy job (in step S28 in FIG. 3). The determination time may be a constant period regardless of jobs, or may be a period obtained through calculation based on the document data size or the like of the actual job corresponding to the dummy job.

Thus, the dummy job and the actual job are explicitly associated with each other, whereby determination as to whether or not a notification of the actual job has been transmitted within the determination time starting from the detection of the dummy job (S28) is correctly made for each job.

Second Modified Exemplary Embodiment

In the case where the dummy job and the actual job are not associated with each other, when the image forming apparatus 300 receives multiple jobs at short intervals, the dummy job and the actual job may be received in the opposite order.

For example, when a user instructs the client apparatus 100 to print a document A and a document B sequentially in this order, the image forming apparatus 300 receives the dummy job for the document A and that for the document B in this order. If print preparation for the document A takes time, for example, because the document A is much larger than the document B, the image forming apparatus 300 may receive the actual job for the document B, and may subsequently receive the actual job for the document A. In the case where the dummy job and the actual job are not associated with each other, such reception in the opposite order causes the actual jobs to be executed in the order which is reverse to the order in which the dummy jobs are executed. That is, the order in which jobs are performed (printed) is different from the order in which the user gives print instructions.

In the second modified exemplary embodiment, the association between the dummy job and the actual job which is similar to that in the first modified exemplary embodiment is used, whereby printing is performed in the order in which print instructions are given.

In the second modified exemplary embodiment, when the image forming apparatus 300 detects the dummy job (in step S26 in FIG. 3), the processes of subsequent jobs (that is, dummy jobs and actual jobs according to print instructions transmitted to the print service 200 after the dummy job) are suspended until execution (printing) of the actual job corresponding to the dummy job is completed. The "suspending" of subsequent jobs means that at least reception and printing (in step S20 in FIG. 3) of print data of the actual jobs for the subsequent jobs are not performed and are suspended. Processes may be suspended in a stage earlier than step S20, for example, in the stage in step S18 or S16. When printing of the previous actual job which causes the suspending state is completed, the subsequent jobs which have been suspended are released from the suspending state. Thus, the suspending of subsequent jobs eliminates a state in which the actual job for a job whose dummy job is received by the image forming apparatus 300 later is executed prior to the actual job for the previous job.

Another exemplary process according to the second modified exemplary embodiment will be described with reference to FIGS. 7 and 8.

Figure 7:
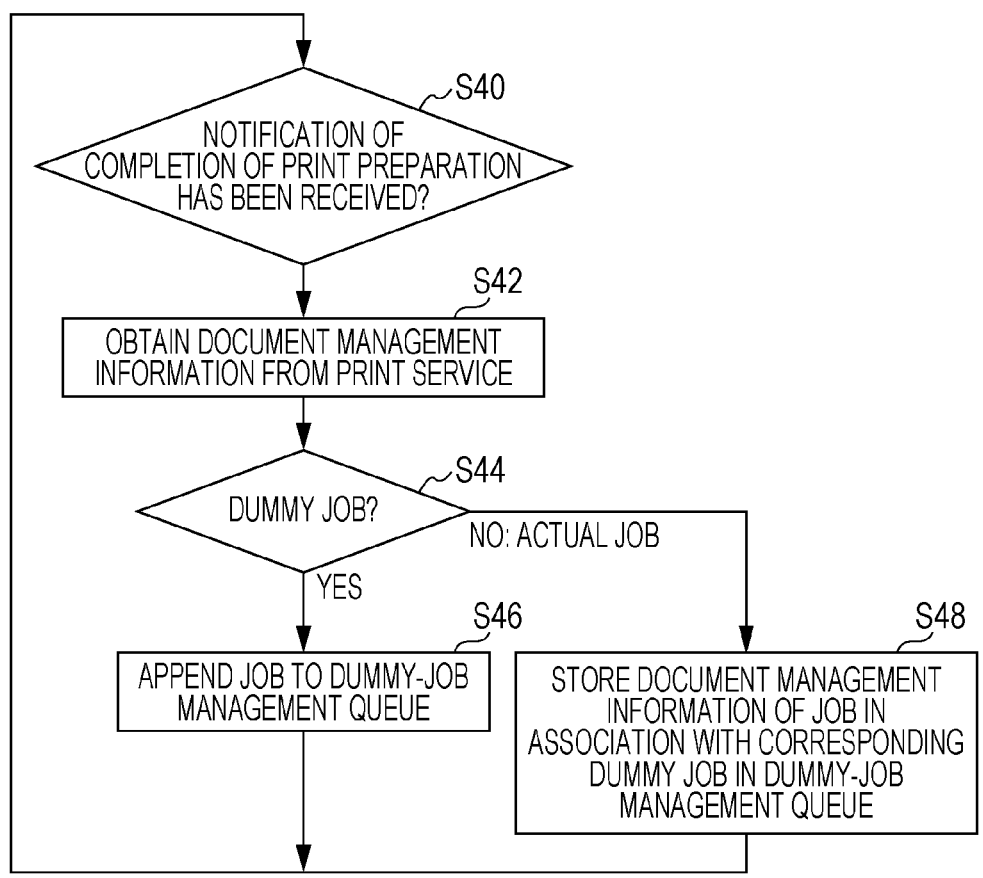
FIG. 7 is a diagram illustrating an exemplary procedure which is performed by a job acquiring unit of the image forming apparatus and which is performed when a notification of completion of print preparation for a job is received from a print service, in a second modified exemplary embodiment.

FIG. 7 illustrates an exemplary process performed by the image forming apparatus 300 (especially by the job acquiring unit 302) when a notification of completion of print preparation for a job is received from the print service 200. In this procedure, the image forming apparatus 300 waits for reception of a notification of completion of print preparation for the job from the print service 200 (in step S40). If a notification of completion of print preparation is received in step S40 (corresponding to step S14 or S24 in FIG. 3), document management information for the job is obtained from the print service 200 (in step S42 which corresponds to step S16 or S26 in FIG. 3), and determines whether or not the job is a dummy job from the obtained document management information (in step S44). If the job is a dummy job, (the identification information of) the dummy job is appended to a dummy-job management queue (not illustrated) which is a queue for managing the execution order (in step S46). The document management information for the dummy job is stored in such a manner as to be capable of being referred to by using the identification information of the dummy job which is put in the dummy-job management queue. If it is determined that the job is an actual job in step S44 (if the determination result is NO), information indicating that print preparation for the actual job is completed, and the document management information for the actual job are stored in association with the dummy-job information which corresponds to the actual job and which is put in the dummy-job management queue (in step S48).

Figure 8:
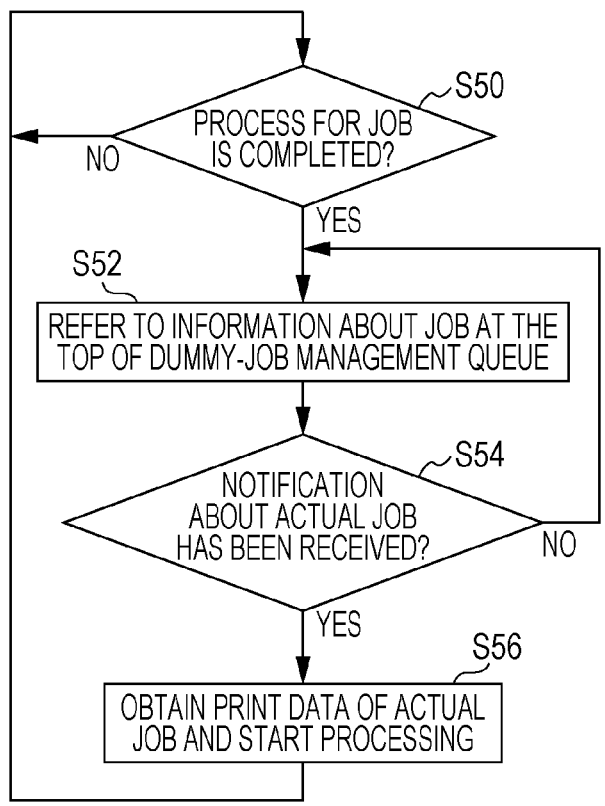
FIG. 8 is a diagram illustrating an exemplary procedure for processing a job which is present in a dummy-job management queue, in the second modified exemplary embodiment.

For example, according to the procedure in FIG. 8, the image forming apparatus 300 sequentially executes jobs which are put in the dummy-job management queue according to the procedure in FIG. 7. In the procedure in FIG. 8, the image forming apparatus 300 waits for completion of the process for a job for which printing is being performed (in step S50). When the process is completed, the image forming apparatus 300 refers to information about the dummy job at the top of the dummy-job management queue (that is, the dummy job which was put in the queue earlier than the other jobs in the queue) (in step S52), and determines whether or not a notification of completion of print preparation (and the document management information) for the actual job corresponding to the dummy job at the top has been received (in step S54). If the determination result in step S54 is NO (the notification has not been received), the image forming apparatus 300 waits for a predetermined time, repeatedly performs steps S52 and S54, and checks again if print preparation of the actual job for the job at the top of the queue has been completed. If the determination result in step S54 is YES (the notification has been received), the image forming apparatus 300 obtains print data of the actual job from the print service 200, and processes the print data to perform printing (in step S56). Then, the image forming apparatus 300 waits for completion of the process for the print data (in step S50). If the process is completed, the image forming apparatus 300 checks if the next job in the dummy-job management queue is available for being performed (in steps S52 and S54).

Third Modified Exemplary Embodiment

Another way of using a dummy job used in the exemplary embodiment will be described.

When print data is downloaded from GCP (print service 200) to the image forming apparatus 300 and is printed, a known problem in that, when the download fails due to some reason such as communication interruption, it is not possible to transmit a request to perform download again, from the image forming apparatus 300 to the print service 200 may arise. This results from the mechanism of state transition in a job in GCP. This will be described first.

In GCP, the job status is managed from the standpoint of the image forming apparatus 300. That is, a job is not present until the image forming apparatus 300 recognizes the job. When the image forming apparatus 300 recognizes the job, GCP generates status information for the job, and, in each progress stage of the process performed after that, makes a transition in the job status in accordance with a request for a state transition which is received from the status notifying unit 310 of the image forming apparatus 300. The job statuses in GCP include three states "waiting", "in progress", and "completed (printed)" which are normal progress stages, and also include an "error" state used when an error occurs. The specification of GCP defines which state transition is to be requested by the image forming apparatus 300 from GCP in which stage. That is, in the stage in which a notification of completion of print preparation (such as conversion of document data) (S14) is received, the image forming apparatus 300 recognizes presence of the job. For example, when the image forming apparatus 300 requests management information for the job from the print service 200 in step S16 in response to the notification, the image forming apparatus 300 requests the print service 200 to set the job status to "waiting". After that, when the process of the job is ready to be performed because the process of another job which is obtained before the job is completed, the image forming apparatus 300 transmits a request for downloading print data of the job in step S18. At that time, the image forming apparatus 300 requests the print service 200 to make a transition to "in progress" in the job status. When downloading and printing (S20) of the print data are successfully completed, the image forming apparatus 300 requests the print service 200 to make a transition to "completed" in the job status. When a failure occurs due to a paper jam or the like in the middle of the downloading and printing (S20) of the print data, the image forming apparatus 300 requests the print service 200 to make a transition to "error" in the job status. The state transition from "waiting" to "in progress" and the state transition from "in progress" to "completed" are one-way transitions and a state transition in the opposite direction is not made.

GCP receives a request for downloading print data of a job in the "waiting" state, but does not receive a request for downloading print data of a job in the "in progress" state. Therefore, for a job in which, according to the specification, a transition has been made to the "in progress" state upon start of download, when downloading and printing of the print data fails, even if a request for downloading the print data again is transmitted to GCP to perform printing again, the request will not be accepted. Therefore, to perform printing again in the related art in this case, a user has to go back to the client apparatus 100 and instruct the print service 200 to print the document data again.

If a state transition to "in progress" is not requested at the time point at which downloading of print data is started (in step S18) and the job status remains in "waiting", downloading of print data may be requested from the print service 200 again upon occurrence of a print failure. However, in this case, a problem in that it is not possible to express the job status correctly arises. That is, in the stage in which printing is being performed after downloading is started, the image forming apparatus 300 is now "processing" (that is, printing) the print job. A correct expression for this state is "in progress". Expression "waiting" for this state is misleading. In addition, after start of downloading, until printing is completed, there is no definite point at which a state transition is to be made. At the time point of completion of printing, if a transition from "waiting" to "completed" is made at once, the "in progress" stage is not present, and the "in progress" state is meaningless. Thus, a mechanism having some room for downloading print data again, in preparation for a download failure or the like is not easily compatible with a mechanism in which a correct job status is displayed.

Accordingly, in the third modified exemplary embodiment, a dummy job is used to display a correct status for the job corresponding to print data while some room for downloading print data again, in preparation for a download failure or the like is provided. That is, in the exemplary embodiment, two jobs, a dummy job and an actual job, are created for a single print instruction. The status of a job (a collective term for an actual job and a dummy job corresponding to the actual job) according to the print instruction is expressed by using the status of the dummy job. Thus, a correct job status is expressed by using the status of the dummy job. Accordingly, even if the status of the actual job remains "waiting" in which another downloading process is allowed, a problem does not substantially arise.

Figure 9:
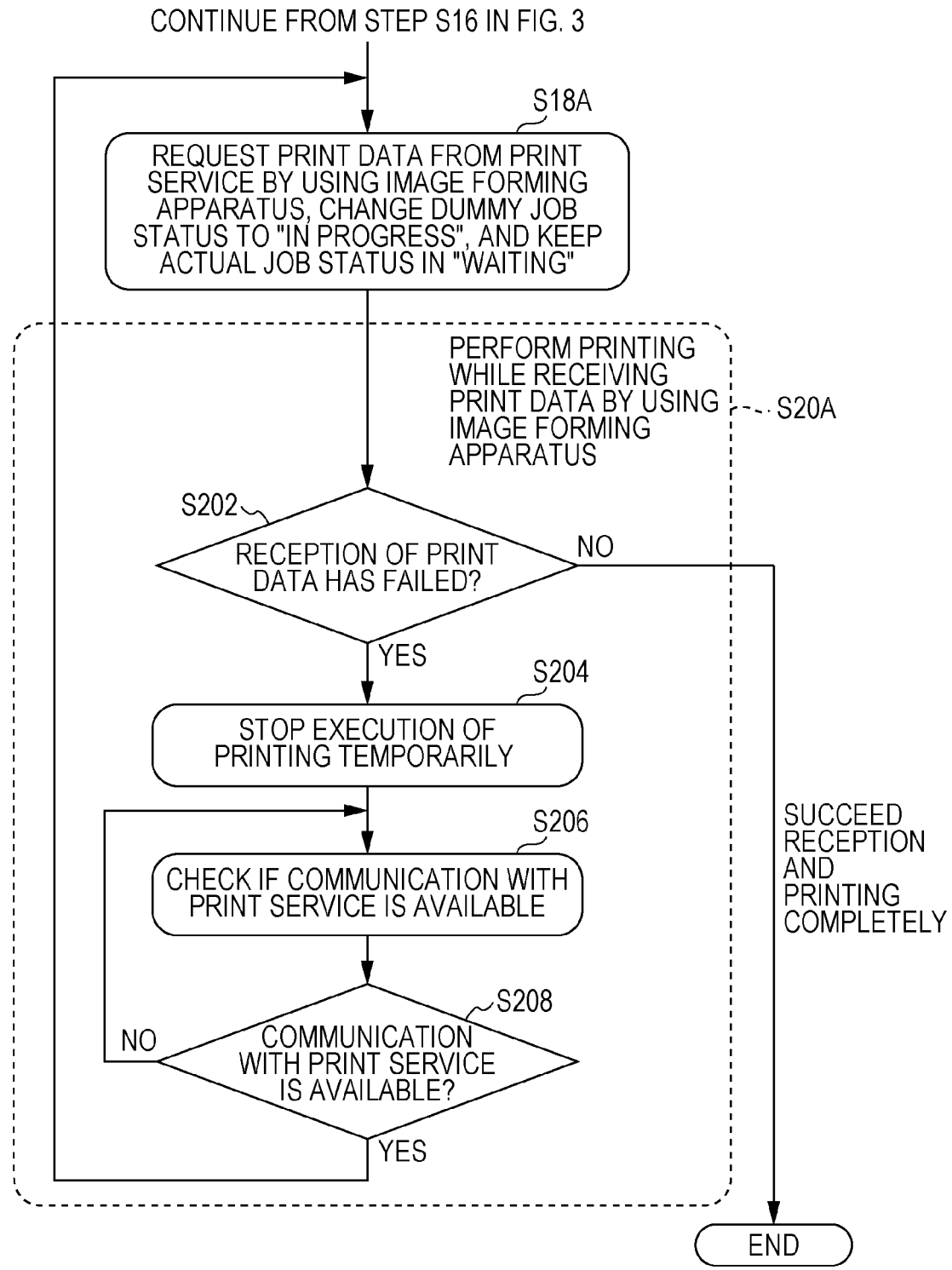
FIG. 9 is a diagram illustrating an exemplary procedure according to a third modified exemplary embodiment.

The example of the procedure in the third modified exemplary embodiment will be described with reference to FIG. 9. FIG. 9 illustrates the process flow subsequent to step S16 in FIG. 3. In the process flow, steps S18A and S20A are obtained by changing steps S18 and S20 in FIG. 3.

As a precondition of the process in FIG. 9, the print service 200 and the image forming apparatus 300 manage a job status for each of a dummy job and an actual job separately. In step S26 in FIG. 3, when the image forming apparatus 300 detects a dummy job, status information indicating the job status of the dummy job is created in each of the image forming apparatus 300 and the print service 200, and "waiting" is set to the status information. When the image forming apparatus 300 detects an actual job (in step S16 in FIG. 3), status information indicating the status of the actual job is created in each of the image forming apparatus 300 and the print service 200, and "waiting" is set to the status information.

When an actual job is detected in step S16, the image forming apparatus 300 requests print data of the actual job from the print service 200 in step S18A, and starts downloading the print data. In addition, the image forming apparatus 300 makes a transition from "waiting" to "in progress" in the status of the dummy job corresponding to the actual job (that is, requests the print service 200 to make such a transition). In contrast, the status of the actual job is not changed at that time point (that is, remains in "waiting").

In step S20A, when the print data is being printed out while being received (downloaded), whether or not a failure occurs in the reception is determined (in step S202). If a failure occurs in the reception, the printing for the job which is being executed is temporarily stopped, and the job is suspended (in step S204). At that time, if another job is present, the "another job" may be executed instead of the suspended job. After that, the image forming apparatus 300 (especially, the job acquiring unit 302) periodically checks if the image forming apparatus 300 is capable of communicating with the print service 200 (in step S206). In the case of GCP, the checking process may be performed, for example, by using the fetch interface. The fetch interface is an application programming interface (API) used when an inquiry about whether or not jobs for the image forming apparatus 300 are present is transmitted to GCP (print service 200). Similarly to ping used to check whether or not communication is available in an Internet Protocol (IP) network, the fetch interface is used to determine whether or not communication with GCP is available by submitting a fetch. The check process in step S206 is periodically repeated until communication is available. If it is confirmed that communication with the print service 200 is available (if the determination result is YES in step S208), the image forming apparatus 300 returns back to step S18A, and requests print data of the suspended job (actual job) from the print service 200. At that time, the status of the actual job is "waiting". Therefore, the print service 200 receives the request, and supplies the print data to the image forming apparatus 300. The image forming apparatus 300 receives the supplied print data, and performs printing (in step S20A).

If reception and printing of all of the print data are completed (if the determination result is NO in step S202), the image forming apparatus 300 requests the print service 200 to make a transition to "completed" in both of the dummy-job status and the actual-job status, and ends the process.

In the procedure in FIG. 9, when reception of print data of a job fails, the image forming apparatus 300 automatically obtains the print data again. Instead of this, print data may be obtained again after a confirmation is obtained from a user. In this case, when reception of print data fails in step S202, the image forming apparatus 300 displays an inquiry screen 510 as illustrated, for example, in FIG. 10 on an attached display apparatus. In the inquiry screen 510, a message that downloading of the print data fails, and buttons for giving an instruction to obtain or not to obtain the print data again are displayed. In the inquiry screen, when a user presses the button for obtaining the print data again, the image forming apparatus 300 proceeds the process to step S206 in FIG. 9, and obtains the print data again when communication with the print service 200 is available.

Figure 10:
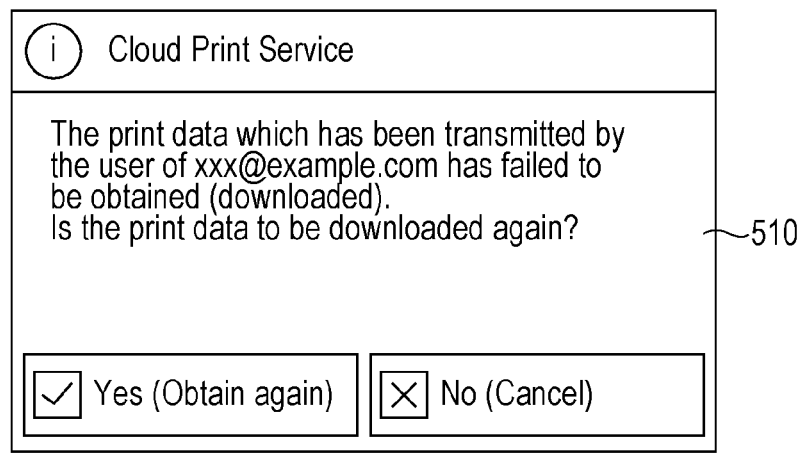
FIG. 10 is a diagram illustrating an exemplary screen for asking whether or not print data is to be obtained again.

When reception of print data of the job fails, the image forming apparatus 300 automatically performs steps S206, S208, and S18A in FIG. 9, and obtains the print data again. When the process of obtaining the print data again repeatedly fails a predetermined number of times or more, the screen as illustrated in FIG. 10 may be displayed, and whether or not print data is to be further obtained again may be checked with the user.

Figure 11:
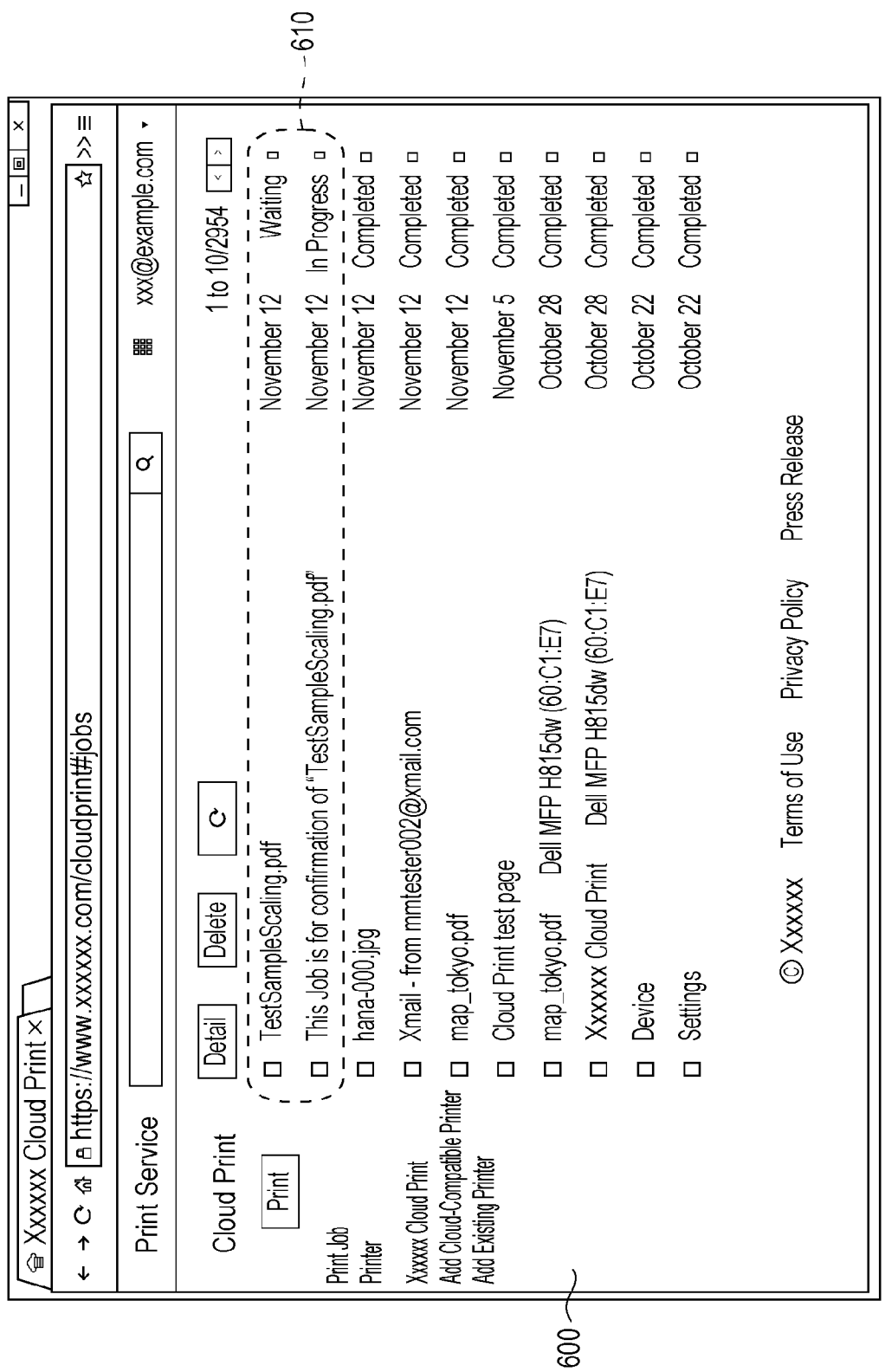
FIG. 11 is a diagram illustrating an exemplary job status screen generated by the print service in accordance with a notification about state transition which is transmitted from the image forming apparatus.

FIG. 11 illustrates an exemplary job status screen 600 generated by the print service 200 in accordance with a notification of the state transition which is transmitted from the status notifying unit 310 of the image forming apparatus 300. The job status screen 600 is provided, for example, as a web page for a user operating the client apparatus 100. In the job status screen 600, job statuses corresponding to print instructions transmitted by the user to the print service 200 are displayed. In a portion surrounded by a dashed line 610 in the job status screen 600, status information (the second line in the portion surrounded by the dashed line) of the dummy job corresponding to one print instruction, and status information (the first line) of the actual job are displayed. In each piece of status information, identification information of the job, the date when the job was issued, and the status are displayed from the left in this order. In this example, the identification information of a job is the file name of document data specified by a user as a print target. However, for a dummy job, a file name obtained by adding words indicating that the job is a dummy job, to the file name of the document data of the corresponding actual job is used as identification information. In the example in FIG. 11, while the identification information of an actual job is "TestSampleScaling.pdf", the identification information of the dummy job is "This Job is for confirmation of 'TestSampleScaling.pdf'" which indicates that this job is a "confirmation" for confirming "TestSampleScaling.pdf". The identification information of a dummy job may be generated by the dummy-job adding unit 112 or 202 from the identification information of the actual job. A user may get information about the execution state for a print instruction given by the user, from the status of the dummy job.

In the example in FIG. 11, in the job status screen 600, both of the status of an actual job and that of a dummy job are displayed. In this case, the print service 200 does not distinguish between the dummy job and the actual job which are received from the client apparatus 100, and may handle them as simple jobs and manage the statuses.

In contrast, no information about a dummy job may be displayed in the job status screen 600. Simply, no lines, each of which indicates the status of a corresponding dummy job, may be displayed in the job status screen 600. In addition to this, the status value of the corresponding actual job may be changed to the status value of the dummy job, and the changed value may be displayed. In either case, the print service 200 recognizes whether the job is a dummy job or an actual job, and controls whether or not the job status is to be displayed and whether or not the status value is to be changed to the status of the corresponding dummy job, in accordance with the recognition result.

In the case of a system aiming high security, the image forming apparatus 300 may have a configuration which is not described above and in which an access token obtained from a user in advance (for example, a token in conformity with OAuth) is presented to the print service 200 in order to certify that the user has a valid acquisition permission when a print job for the user is obtained from the print service 200. In this case, when the image forming apparatus 300 obtains the print data from the print service 200 again, two methods may be employed: (1) a method in which an access token which has been used so far (that is, until a reception failure is detected in step S202) continues to be used to obtain the print data again; and (2) a method in which a new access token is obtained from the user and in which the new access token is presented to the print service 200 to obtain the print data again. The second method takes time because a new access token needs to be obtained. However, in the case where a failure in reception of print data is due to an access token, unless a new access token is obtained from the user, the print data will not be successfully obtained again.

Therefore, in one example, the image forming apparatus 300 tries to obtain print data again from the print service 200 by using the method (1) (using the same access token as before) which takes a relatively short process time. Even after the image forming apparatus 300 repeatedly performs the try a predetermined number of times, when the print data is not successfully obtained (that is, all of the print data is not received), the image forming apparatus 300 obtains the print data again from the print service 200 by using the method (2) (in which a new access token is obtained from the user).

In another method, when print data fails to be received in step S202, the image forming apparatus 300 selects which method, the method (1) or the method (2), is to be employed, in accordance with the failure event. If the failure event is, for example, such that timeout occurs without a response to a request for acquisition of print data, from the print service 200, or such that the destination (URL of the print service 200) of the acquisition request (for example, an HTTP GET method) fails to be resolved in a domain name server (DNS), such an event is independent of an access token. Therefore, the image forming apparatus 300 selects the method (1) to obtain print data again. In contrast, if the failure event is such that authentication performed by presenting an access token from the image forming apparatus 300 to the print service 200 fails, or such that an error regarding authentication, such as a secure sockets layer (SSL) certificate error, occurs, the access token may cause the failure. Therefore, the image forming apparatus 300 selects the method (2) to obtain print data again.

Fourth Modified Exemplary Embodiment

The image forming apparatus 300 may have a function of printing information regarding the actual job corresponding to a dummy job when the image forming apparatus 300 obtains the dummy job from the print service 200. The information regarding an actual job which is to be printed includes the document file name of the actual job, the data size of the actual job, and a predicted time at which the process of generating print data of the actual job in the print service 200 is completed. For example, the information regarding an actual job may be generated from information about the actual job when the dummy-job adding unit 112 or 202 adds a dummy job corresponding to the actual job. For example, the dummy-job adding unit 112 or 202 receives document data of the actual job to be printed, and is therefore capable of recognizing the file name and the data size of the document data. The dummy-job adding unit 112 or 202 may set the file name and the data size of the document data, as the file name and the data size of the actual job, to an item of attribute information of the dummy job to be added. The required time for the print service 200 to convert document data to print data, or the required time for transmitting document data from the client apparatus 100 to the print service 200 depends on the data size of the document data. Accordingly, the dummy-job adding unit 112 or 202 may obtain the required times from the size of the document data, calculate a predicted time at which the process of generating print data of the actual job is completed, from the required times and the current time, and set the time to an item in the attribute information of the dummy job to be appended. The image forming apparatus 300 recognizes specific items, such as the data size of the actual job and a predicted time at which the process of generating print data of the actual job is completed, in the attribute information of the dummy job which is obtained in step S24 or S26, and prints a message, such as "From now, TestSam-pleScaling.pdf (the file name of the actual job) is scheduled to be printed. The data size of this job is about ** bytes, and the job will be printed about at ::.", which describes the recognized information, on a sheet of paper. The predicted time at which the process of generating print data of the actual job is completed may be obtained by the image forming apparatus 300 from the data size of the document data of the actual job. As another example, the dummy-job adding unit 112 or 202 may generate a dummy job as a print job including a message describing such information about the actual job, and the image forming apparatus 300 may print the dummy job.

The exemplary embodiment and modified exemplary embodiments of the present invention are described above.

The units which perform information processing and which are included in the client apparatus 100, the print service 200, and the image forming apparatus 300 which are exemplarily described are implemented, for example, by causing a general-purpose computer to execute programs describing the processes for functional modules in the above-described apparatuses. For example, a computer which is herein mentioned has, as hardware, a circuit configuration in which a microprocessor such as a central processing unit (CPU), memories (primary memories), such as a random access memory (RAM) and a read-only memory (ROM), a secondary memory controller which controls secondary memories, such as a hard disk drive (HDD), a solid state drive (SSD), and a flash memory, various input/output (I/O) interfaces, a network interface which performs control of connection with a wireless or wired network, and like are connected with each other via a bus or the like. In addition, disk drives for performing reading and/or writing on portable disk recording media, such as a compact disk (CD), a digital versatile disk (DVD), and a Blu-ray Disc, memory reader/writers for performing reading and/or writing on portable nonvolatile recording media based on various specifications, such as a flash memory, and the like may be connected, for example, via an I/O interface to the bus. Programs describing process information of the functional modules which are exemplarily described above are stored in a secondary memory device such as a flash memory via a recording medium, such as a CD or a DVD, or via a communication unit such as a network, and are installed in a computer. The programs stored in the secondary memory device are read out to the RAM, and are executed by a microprocessor such as a CPU, whereby the functional modules which are exemplarily described above are implemented. The print service 200 may be achieved through cooperation of multiple computers.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
 a processor configured to:
 acquire print data from an external apparatus via a network, the print data being generated by the external apparatus from document data received from a client apparatus, wherein a dummy job and the actual job correspond;

determine whether or not the acquired print data is the dummy job or an actual job; and notify failure information in response to print data of the actual job, corresponding to the dummy job, is not acquired within a period after print data which is determined to be the dummy job is acquired, the failure information indicating a failure occurring in the process in which the external apparatus receives the document data from the client apparatus, or in the process in which the print data is generated from the document data in the external apparatus, the period satisfying a predetermined condition.

2. The image forming apparatus according to claim 1, wherein the dummy job contains size information indicating size of corresponding document data, and wherein the processor is configured to use a period obtained on a basis of the size information contained in the dummy job, as the period satisfying the predetermined condition.

3. The image forming apparatus according to claim 1, wherein at least one of the dummy job and the actual job contains specific information specifying a corresponding actual job or a corresponding dummy job, and wherein the processor is configured to notify the failure information when the print data of the actual job determined to correspond to the dummy job on a basis of the specific information is not acquired within the period after the print data determined to be the dummy job is acquired, the period satisfying the predetermined condition.

4. The image forming apparatus according to claim 2, wherein at least one of the dummy job and the actual job contains specific information specifying a corresponding actual job or a corresponding dummy job, and wherein the processor is configured to notify the failure information when the print data of the actual job determined to correspond to the dummy job, on a basis of the specific information is not acquired within the period after the print data determined to be the dummy job is acquired, the period satisfying the predetermined condition.

5. The image forming apparatus according to claim 3, wherein the processor is further configured to process the print data of the actual job acquired by the processor, in order to print the print data; and for a subsequent dummy job being acquired by the processor within a certain period, the certain period being from a time point at which the processor acquires the print data of the dummy job to a time point at which the processor processes the print data of the actual job corresponding to the dummy job, the print data of the actual job being acquired, is configured to control in such a manner that the process in which the processor processes print data of an actual job corresponding to the subsequent dummy job is suspended at least for the certain period.

6. The image forming apparatus according to claim 4, wherein the processor is further configured to process the print data of the actual job acquired by the processor, in order to print the print data; and for a subsequent dummy job being acquired by the processor within a certain period, the certain period being from a time point at which the processor acquires the print data of the dummy job to a time point at which the processor processes the print data of the actual job corresponding to the dummy job, the print data of the actual job being acquired, is configured to control in such a manner that the process in which the processor processes print data of an actual job corresponding to the subsequent dummy job is suspended at least for the certain period.

7. The image forming apparatus according to claim 1, wherein the processor is further configured to notify the external apparatus of a transition in a job status for the print data acquired by the processor, wherein, when acquisition of the print data of the actual job is started, the processor is configured to notify the external apparatus of a transition from "waiting" to "in progress" in a status of the dummy job corresponding to the actual job, while, for the actual job, the processor is configured to not notify the external apparatus of a transition from "waiting" to "in progress", causing the status of the dummy job to transition to "in progress" and causing the status of the actual job to remain in "waiting", the status of the dummy job being managed by the external apparatus; and in response to the processor failing to acquire the print data of the actual job, causes the processor to acquire the print data of the actual job again.

8. The image forming apparatus according to claim 2, wherein the processor is further configured to notify the external apparatus of a transition in a job status for the print data acquired by the processor, wherein, in response to acquisition of the print data of the actual job is started, the processor is configured to notify the external apparatus of a transition from "waiting" to "in progress" in a status of the dummy job corresponding to the actual job, while, for the actual job, the processor is configured to not notify the external apparatus of a transition from "waiting" to "in progress", causing the status of the dummy job to transition to "in progress" and causing the status of the actual job to remain in "waiting", the status of the dummy job being managed by the external apparatus; and in response to the processor failing to acquire the print data of the actual job, causes the processor to acquire the print data of the actual job again.

9. The image forming apparatus according to claim 3, wherein the processor is further configure to notify the external apparatus of a transition in a job status for the print data acquired by the processor, wherein, in response to acquisition of the print data of the actual job is started, the processor is configured to notify the external apparatus of a transition from "waiting" to "in progress" in a status of the dummy job corresponding to the actual job, while, for the actual job, the processor is not configured to notify the external apparatus of a transition from "waiting" to "in progress", causing the status of the dummy job to transition to "in progress" and causing the status of the actual job to remain in "waiting", the status of the dummy job being managed by the external apparatus; and in response to the processor failing to acquire the print data of the actual job, causes the processor to acquire the print data of the actual job again.

10. The image forming apparatus according to claim 4, wherein the processor is further configured to notify the external apparatus of a transition in a job status for the print data acquired by the processor, wherein, in response to acquisition of the print data of the actual job is started, the processor is configured to notify the external apparatus of a transition from "waiting" to "in progress" in a status of the dummy job corresponding to the actual job, while, for the actual job, the processor is not configured to notify the external apparatus of a transition from "waiting" to "in progress", causing the status of the dummy job to transition to "in progress" and causing the status of the actual job to remain in "waiting", the status of the dummy job being managed by the external apparatus; and in response to the processor failing to acquire the print data of the actual job, causes the processor is configured to acquire the print data of the actual job again.

11. The image forming apparatus according to claim 5, wherein the processor is further configured to notify the external apparatus of a transition in a job status for the print data acquired by the processor, wherein, when acquisition of the print data of the actual job is started, the processor is configured to notify the external apparatus of a transition from "waiting" to "in progress" in a status of the dummy job corresponding to the actual job, while, for the actual job, the processor is not configured to notify the external apparatus of a transition from "waiting" to "in progress", causing the status of the dummy job to transition to "in progress" and causing the status of the actual job to remain in "waiting", the status of the dummy job being managed by the external apparatus; and in response to the processor failing to acquire the print data of the actual job, causes the processor to acquire the print data of the actual job again.

12. The image forming apparatus according to claim 6, wherein the processor is further configured to notify the external apparatus of a transition in a job status for the print data acquired by the processor, wherein, in response to acquisition of the print data of the actual job is started, the processor is configured to notify the external apparatus of a transition from "waiting" to "in progress" in a status of the dummy job corresponding to the actual job, while, for the actual job, the processor is not configured notify the external apparatus of a transition from "waiting" to "in progress", causing the status of the dummy job to transition to "in progress" and causing the status of the actual job to remain in "waiting", the status of the dummy job being managed by the external apparatus; and in response to the processor failing to acquire the print data of the actual job, causes the processor to acquire the print data of the actual job again.

13. The image forming apparatus according to claim 1, wherein in response to the processor determining that the print data acquired by the processor is a dummy job, prints information about the actual job corresponding to the dummy job.

14. An image processing system comprising:
a client apparatus;
an external apparatus configured to generate print data from document data received from the client apparatus, and configured to provide the generated print data to an image forming apparatus; and
the image forming apparatus that processes the print data in order to print the print data, the print data being acquired from the external apparatus,
wherein the client apparatus includes:
a first processor configured to:
in response to a print instruction for the document data is received from a user, before the document data is transmitted as an actual job to the external apparatus, transmit document data of a dummy job via a network to the external apparatus, and
wherein the image forming apparatus includes:
a second processor configured to:
acquire print data of the dummy job and the actual job via the network from the external apparatus,
determine whether or not the acquired print data is a dummy job or an actual job, and
notify failure information when print data of the actual job is not acquired within a period after print data which is determined to be the dummy job is acquired, the failure information indicating a failure occurring in the process in which the external apparatus receives the document data from the client apparatus, or in the process in which the print data is generated from the document data in the external apparatus, the period satisfying a predetermined condition.

15. An image processing system comprising:
a client apparatus;
an external apparatus configured to generate print data from document data received from the client apparatus, and configured to provide the generated print data to an image forming apparatus via a network; and
the image forming apparatus that processes the print data in order to print the print data, the print data being acquired from the external apparatus,
wherein the client apparatus includes:
a first processor configured to:
in response to a print instruction for the document data is received from a user, transmit the document data to the external apparatus, and
wherein the external apparatus includes:
a second processor configured to:
generate print data of the actual job from the document data received from the client apparatus, and
before the print data of the actual job is transmitted via the network to the image forming apparatus, transmit print data of a dummy job via the network to the image forming apparatus, the print data of the actual job being generated by the second processor, and
wherein the image forming apparatus includes:
a third processor configure to:
acquire print data of the dummy job and the actual job via the network from the external apparatus,
determine whether or not the acquired print data is a dummy job or an actual job, and
notify failure information when the print data of the actual job is not acquired within a period after print data which is determined to be the dummy job is acquired, the failure information indicating a failure occurring in the process in which the external apparatus receives the document data from the client apparatus, or in the process in which the print data is generated from the document data in the external apparatus, the period satisfying a predetermined condition.

16. A method comprising:
in response to a client apparatus receives a print instruction for document data from a user, before the document data is transmitted as an actual job to an external apparatus, transmitting document data of a dummy job via a network from the client apparatus to the external apparatus;
generating print data of the dummy job from the document data of the dummy job, the document data of the dummy job being received from the client apparatus, and transmitting the print data of the dummy job via the network from the external apparatus to an image forming apparatus;

generating print data of the actual job from the document data of the actual job, the document data of the actual job being received from the client apparatus, and transmitting the print data of the actual job via the network from the external apparatus to the image forming apparatus;

acquiring the print data of the dummy job or the actual job via the network from the external apparatus;

determining whether the acquired print data is a dummy job or an actual job; and notifying failure information when the print data of the actual job is not acquired within a period after print data which is determined to be the dummy job is acquired, the failure information indicating a failure occurring in the process in which the document data is received from the client apparatus, or in the process in which the print data is generated from the document data, the period satisfying a predetermined condition.

17. A method comprising:

transmitting document data from a client apparatus to an external apparatus in response to the client apparatus receives a print instruction for the document data from a user;

generating print data of an actual job from the document data received from the client apparatus;

transmitting print data of a dummy job via a network from the external apparatus to an image forming apparatus before the generated print data of the actual job is transmitted via the network from the external apparatus to the image forming apparatus;

acquiring the print data of the dummy job via the network from the external apparatus;

acquiring the print data of the actual job via the network from the external apparatus;

determining whether the acquired print data is a dummy job or an actual job; and notifying failure information when the print data of the actual job is not acquired within a period after print data which is determined to be the dummy job is acquired, the failure information indicating a failure occurring in the process in which the document data is received from the client apparatus, or in the process in which the print data is generated from the document data, the period satisfying a predetermined condition.

* * * * *